(12) United States Patent
Cheng

(10) Patent No.: US 8,149,281 B2
(45) Date of Patent: Apr. 3, 2012

(54) ELECTRONIC DEVICE AND METHOD FOR OPERATING A PRESENTATION APPLICATION FILE

(75) Inventor: Po-Feng Cheng, Taoyuan (TW)

(73) Assignee: Foxconn Communication Technology Corp., Taoyuan County (TW)

( * ) Notice: Subject to any disclaimer, the term of this patent is extended or adjusted under 35 U.S.C. 154(b) by 181 days.

(21) Appl. No.: 12/755,403

(22) Filed: Apr. 6, 2010

(65) Prior Publication Data

US 2011/0149115 A1    Jun. 23, 2011

(30) Foreign Application Priority Data

Dec. 18, 2009    (CN) .......................... 2009 1 0311839

(51) Int. Cl.
*H04N 5/225*    (2006.01)
*G06F 9/00*    (2006.01)
*G06F 3/00*    (2006.01)
*G06F 3/033*    (2006.01)

(52) U.S. Cl. ................ 348/207.99; 348/207.1; 382/170; 715/732; 715/863

(58) Field of Classification Search ......................... None
See application file for complete search history.

(56) References Cited

U.S. PATENT DOCUMENTS

| | | | | |
|---|---|---|---|---|
| 5,063,604 | A * | 11/1991 | Weiman | 382/170 |
| 6,618,076 | B1 * | 9/2003 | Sukthankar et al. | 348/180 |
| 6,840,627 | B2 * | 1/2005 | Olbrich | 353/42 |
| 7,519,223 | B2 * | 4/2009 | Dehlin et al. | 382/203 |
| 7,702,131 | B2 * | 4/2010 | Chinen et al. | 382/103 |
| 2007/0237387 | A1 * | 10/2007 | Avidan et al. | 382/159 |
| 2008/0244465 | A1 * | 10/2008 | Kongqiao et al. | 715/863 |
| 2009/0077504 | A1 * | 3/2009 | Bell et al. | 715/863 |
| 2009/0154795 | A1 * | 6/2009 | Tan et al. | 382/155 |
| 2011/0069892 | A1 * | 3/2011 | Tsai et al. | 382/218 |

OTHER PUBLICATIONS

Deng, Lawrence Y.; Dong-Liang Lee; Huan-Chao Keh; Yi-Jen Liu; , "Shape context based matching for hand gesture recognition," Frontier Computing. Theory, Technologies and Applications, 2010 IET International Conference on, vol., no., pp. 436-444, Aug. 4-6, 2010.*
Belongie, S.; Malik, J.; , "Matching with shape contexts," Content-based Access of Image and Video Libraries, 2000. Proceedings. IEEE Workshop on, vol., no., pp. 20-26, 2000.*
Salve, S.G.; Jondhale, K.C.; , "Shape matching and object recognition using shape contexts," Computer Science and Information Technology (ICCSIT), 2010 3rd IEEE International Conference on, vol. 9, no., pp. 471-474, Jul. 9-11, 2010.*
Belongie, S.; Malik, J.; Puzicha, J.; , "Matching shapes," Computer Vision, 2001. ICCV 2001. Proceedings. Eighth IEEE International Conference on, vol. 1, no., pp. 454-461 vol. 1, 2001.*
Feng Wang; Chong-Wah Ngo; Ting-Chuen Pong; , "Simulating a Smartboard by Real-Time Gesture Detection in Lecture Videos," Multimedia, IEEE Transactions on, vol. 10, No. 5, pp. 926-935, Aug. 2008.*

* cited by examiner

*Primary Examiner* — Justin P Misleh
(74) *Attorney, Agent, or Firm* — Altis Law Group, Inc.

(57) ABSTRACT

An electronic device and method for operating a presentation application file includes acquiring a histogram of each of a plurality of designated objects, and defining an operation corresponding to each of the plurality of designated objects. The electronic device and method further includes acquiring a histogram of a recognized object in an image, determining a matched designated object by comparing the histogram of the recognized object with the histograms of the designated objects, and executing an operation function corresponding to the matched designated object.

20 Claims, 5 Drawing Sheets

| Designated object (gestures) |  |  |  |  |
|---|---|---|---|---|
| Movement direction | | | ← | → |
| Operation | Page up | Page down | Delete leftward | Delete rightward |

ELECTRONIC DEVICE AND METHOD FOR OPERATING A PRESENTATION APPLICATION FILE

BACKGROUND

1. Technical Field

Embodiments of the present disclosure relate to file operations, and more particularly to an electronic device and a method for operating a presentation application file.

2. Description of Related Art

Presentation applications (e.g., MICROSOFT POWERPOINT) have been widely used in reports and lectures. These applications generate a presentation application file, which may be displayed onto a projection screen. Generally, a presenter needs to stand before the projection screen to conduct a presentation, making operation of the presentation application inconvenient.

What is needed, therefore, is an electronic device and a method for operating a presentation application file.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
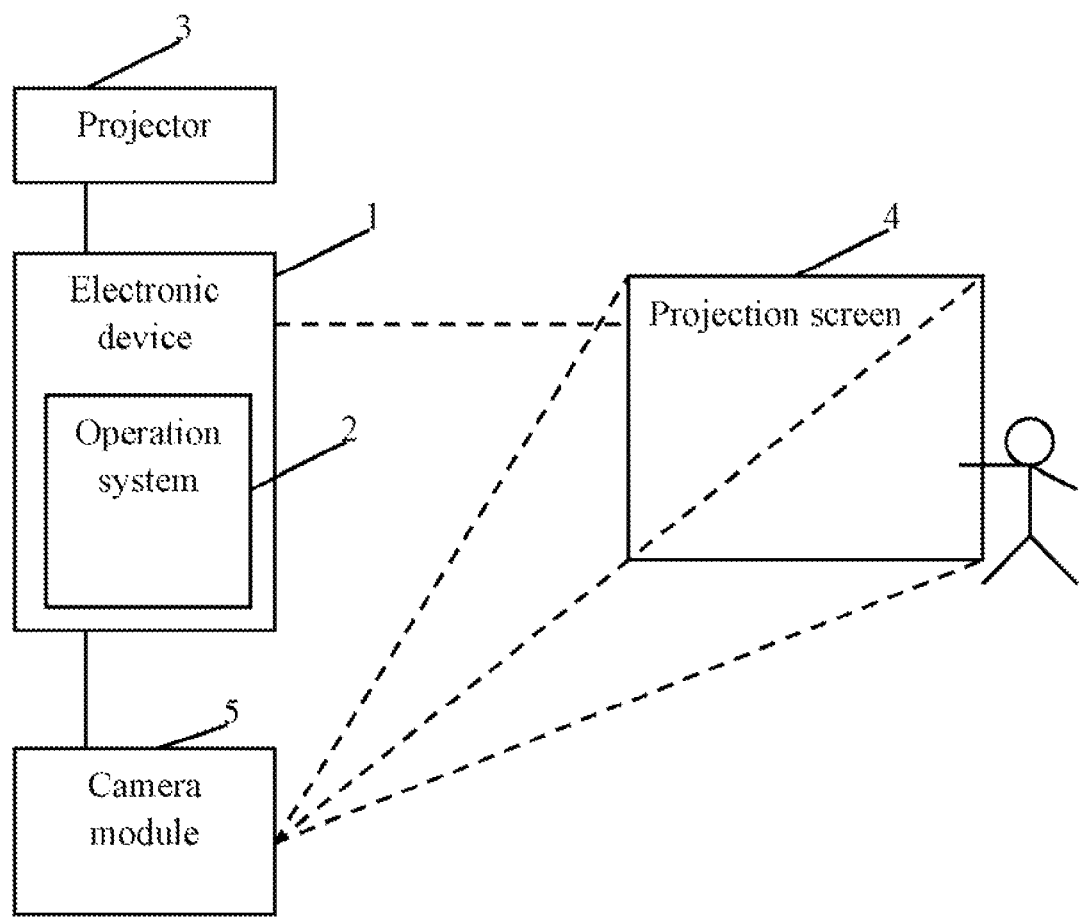
FIG. 1 is a block diagram of one embodiment of an electronic device in communication with a camera module and a projector.

FIG. 1 is a block diagram of one embodiment of an electronic device 1 in communication with a camera module 5 and a projector 3. The projector 3 may project a presentation application file (e.g., a POWERPOINT file) opened in the electronic device 1 onto a projection screen 4. The electronic device 1 includes an operation system 2. In one embodiment, the operation system 2 may be used to designate a plurality of objects, predefine an operation corresponding to each of the plurality of designated objects, and execute the operation to operate a projected presentation application file when recognizing a designated object in an image acquired from the camera module 5. Thereby, the projected presentation application file may be operated directly without any manual operations. The operations may include, but are not limited to, paging up, paging down, and deleting specified contents from the projected file.

In one embodiment, the electronic device 1 may be a computer, a notebook computer, a mobile phone, a personal digital assistant, or any other computing device. The camera module 5 may capture various images to be analyzed by the operation system 2. In one embodiment, an angle of the camera module 5 may be predetermined to capture images from a designated region. As shown in FIG. 1, the camera module 5 is preset to capture images of the projection screen 4. In another embodiment, a timer interval of the camera module 5 to capture continuous images may be also preset, such as 1 second, for example.

Figure 2:
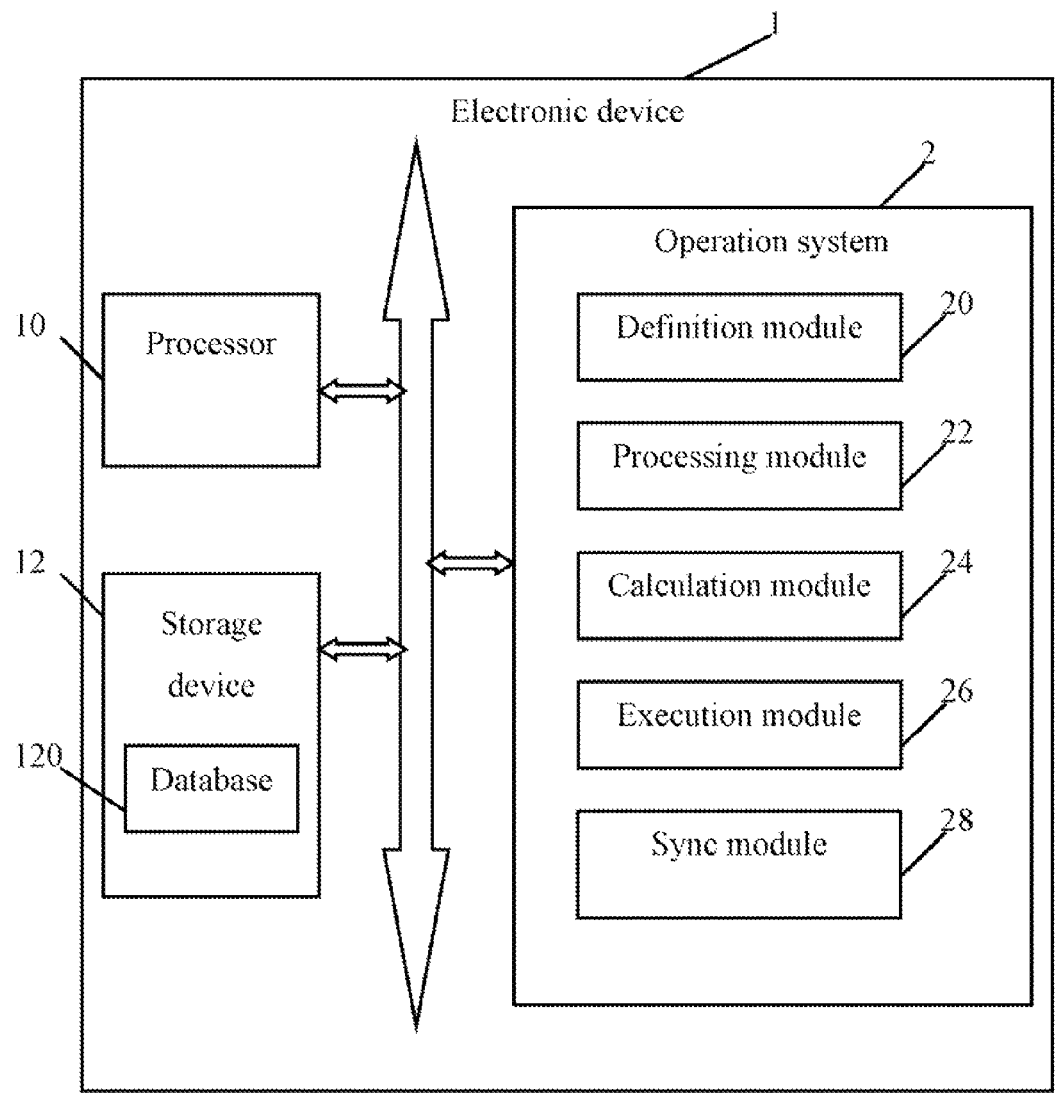
FIG. 2 is a block diagram of one embodiment of the electronic device of FIG. 1 including an operation system.

FIG. 2 is a block diagram of one embodiment of the electronic device 2 including the operation system 2. The electronic device 2 further includes a processor 10 and a storage device 12. The processor 10 executes one or more computerized operations of the electronic device 2 and other applications, to provide functions of the electronic device 2. The storage device 12 stores one or more programs of the electronic device 2, and various kinds of data, such as captured images and predefined operations, for example. In one embodiment, the storage device 12 may be a memory of the electronic device 2, or an external storage card, such as a memory stick, a smart media card, a compact flash card, or any other type of memory media.

In one embodiment, the operation system 2 includes a definition module 20, a processing module 22, a calculation module 24, an execution module 26, and a sync module 28. The modules 20, 22, 24, 26, and 28 may comprise one or more computerized codes to be executed by the processor 10 to perform one or more operations of the operation system 2. Details of these operations will be provided below.

Figure 3:
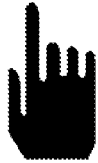
FIG. 3 is a schematic diagram of one embodiment of operations and designated objects of the operation system of FIG. 2.
Figure 3:
Figure 3:
Figure 3:

In one embodiment, the definition module 20 defines a plurality of designated objects. In another embodiment, the definition module 20 may further define one or more movement directions corresponding to each of the plurality of designated objects. As shown in FIG. 3, the designated objects may be hands making different gestures, such as an upward gesture, a downward gesture, and a leftward gesture, for example. In addition, the designated objects also may be a projection pen, a teaching stick, for example. The one or more movement directions corresponding to each of the plurality of designated objects may be upward, downward, leftward, or rightward. As shown in FIG. 3, the upward gesture and the downward gesture have no corresponding movement direction, and the leftward gesture has two movement directions of leftward and rightward.

The processing module 22 acquires an image of each of the plurality of designated objects using the camera module 5, and processes the image to acquire a histogram of each of the plurality of designated objects. In one embodiment, the processing module 22 subtracts background of the image to acquire foreground of the image using Gaussian mix model, and extracts boundaries of the foreground of the image. The processing module 22 calculates a histogram of each boundary point of the boundaries using log-polar coordinates, and acquires the histogram of each of the plurality of designated objects. In another embodiment, the processing module 22 may subtract the background of the image by image smoothing and processing based on two-dimensional wavelet analysis and mid-value filter. The boundaries of the foreground of the image may be extracted using a boundary tracing technology.

In one embodiment, the user may make a gesture using his/her hand within an effective capture area of the camera module 5, which transmits the captured image data to the processing module 22. For example, the user may stand near to the projection screen 4, and make a gesture before the projection screen 4. The processing module 22 acquires the captured image of the projection screen 4, and processes the image to acquire the foreground of the image, that is, the gesture. The processing module 22 further acquires a histogram of the gesture.

In a first embodiment, the definition module 20 defines the operation corresponding to each of the plurality of designated objects. As shown in FIG. 3, the upward gesture corresponds to a paging up operation, and the downward gesture corresponds to a paging down operation. More operations can be predefined by the definition module 22 according to actual requirements, such as an operation of using a pen to underline selected contents, for example.

In a second embodiment, the definition module 20 defines an operation corresponding to each of the plurality of designated objects and a movement direction of each of the plurality of designated objects. As shown in FIG. 3, the leftward gesture having a leftward movement direction corresponds to an operation of deleting contents from a current position towards left. Similarly, the leftward gesture having a rightward movement direction correspond to an operation function of deleting contents from a current position towards right. Detailed descriptions will be provided below.

The definition module 20 further stores the histogram of each of the plurality of designated objects, the movement directions, and corresponding operations into the database 120 of the storage device 12.

After completing definitions, the processing module 22 acquires an image from the camera module 5 if the operation system 2 is enabled. The processing module 22 further processes the image to recognize an object in the image, and acquires a histogram of the recognized object using log-polar coordinates. The processing module 22 processes the image using the same means as mentioned above.

The calculation module 24 compares the histogram of the recognized object with the histograms of the plurality of designated objects, and determines if the histogram of the recognized object matches a histogram of a designated object. In one embodiment, the calculation module 24 may compare the histograms using a sharp context arithmetic to determine if the histograms are matched.

If the histogram of the recognized object matches a histogram of a designated object, the calculation module 24 further determines if the matched designated object has one or more corresponding movement directions.

If the matched designated object has no corresponding movement directions, the execution module 26 executes the operation corresponding to the designated object to operate the projected presentation application file. For example, the user may make a downward gesture, and the processing module 22 processes a captured image including the downward gesture and recognizes the downward gesture. After comparison, the calculation module 24 determines that the downward gesture corresponds to an operation of paging down. Then the execution module 26 executes the operation to page down the projected presentation application file.

If the matched designated object has one or more corresponding movement directions, the processing module 22 acquires continuous images from the camera module 5. As mentioned above, the time interval of the camera module 5 to capture continuous images may be predetermined by the definition module, such as 1 second, for example.

The calculation module 24 determines a movement direction of the recognized object by analyzing the continuous images. In one embodiment, the calculation module 24 determines the movement direction of the recognized object using a mean shift tracking technology or a particle filter to track the recognized object. In another embodiment, the calculation module 24 also may determine the movement direction of the recognized object by calculating different positions of the recognized object in the continuous images.

If the movement direction of the recognized object matches the movement direction of the matched designated object, the execution module 26 executes an operation corresponding to the designated object and the movement direction so as to operate the projected presentation application file.

If an operation of modifying the projected file is invoked, the sync module 28 recognizes start coordinates and end coordinates of the modifications, and maps the start coordinates and end coordinates of the modifications on the projected presentation application file to a presentation application file opened in the electronic device. The sync module 28 further modifies the presentation application file opened in the electronic device 1 according to the modifications on the projected presentation application file.

For example, the execution module 26 may execute an operation using a pen to underline selected content. The user makes the leftward gesture, and moves the leftward gesture from a current position towards left, and stops on an end position. The sync module 28 recognizes start coordinates of the current position and end coordinates of the end position, and maps the start coordinates and end coordinates to the presentation application file opened in the electronic device 1. The sync module 28 synchronizes the modification on the projected presentation application file to the presentation application file opened in the electronic device 1.

In one embodiment, it is assumed that Pro matrix represents a coordinate matrix of the presentation application file opened in the electronic device 1, H matrix represents a transformation matrix, and P matrix represents a coordinate matrix of the projected presentation application file onto the projection screen 4. The Pro coordinate matrix and the H matrix may be transformed using a formula "Pro=H*P."

$$Pro = \begin{bmatrix} x_1 & y_1 \\ x_2 & y_2 \\ \ldots & \ldots \\ x_n & y_n \end{bmatrix}_{2 \times n}, H = \begin{bmatrix} a & b & c \\ d & e & f \end{bmatrix}_{2 \times 3}, P = \begin{bmatrix} x_1 & x_2 & \ldots & x_n \\ y_1 & y_2 & \ldots & y_n \\ 1 & 2 & \ldots & 1 \end{bmatrix}_{3 \times n}.$$

H matrix may be calculated by selecting at least four points in the Pro matrix and P matrix. The at least four points are not located on a same line.

By utilizing the sync module 28, the user may directly modify the presentation application file opened in the electronic device 1 by making corresponding gestures on the projected presentation application file. That is, the user need not operate the electronic device 1 to modify the presentation application file.

Figure 4:
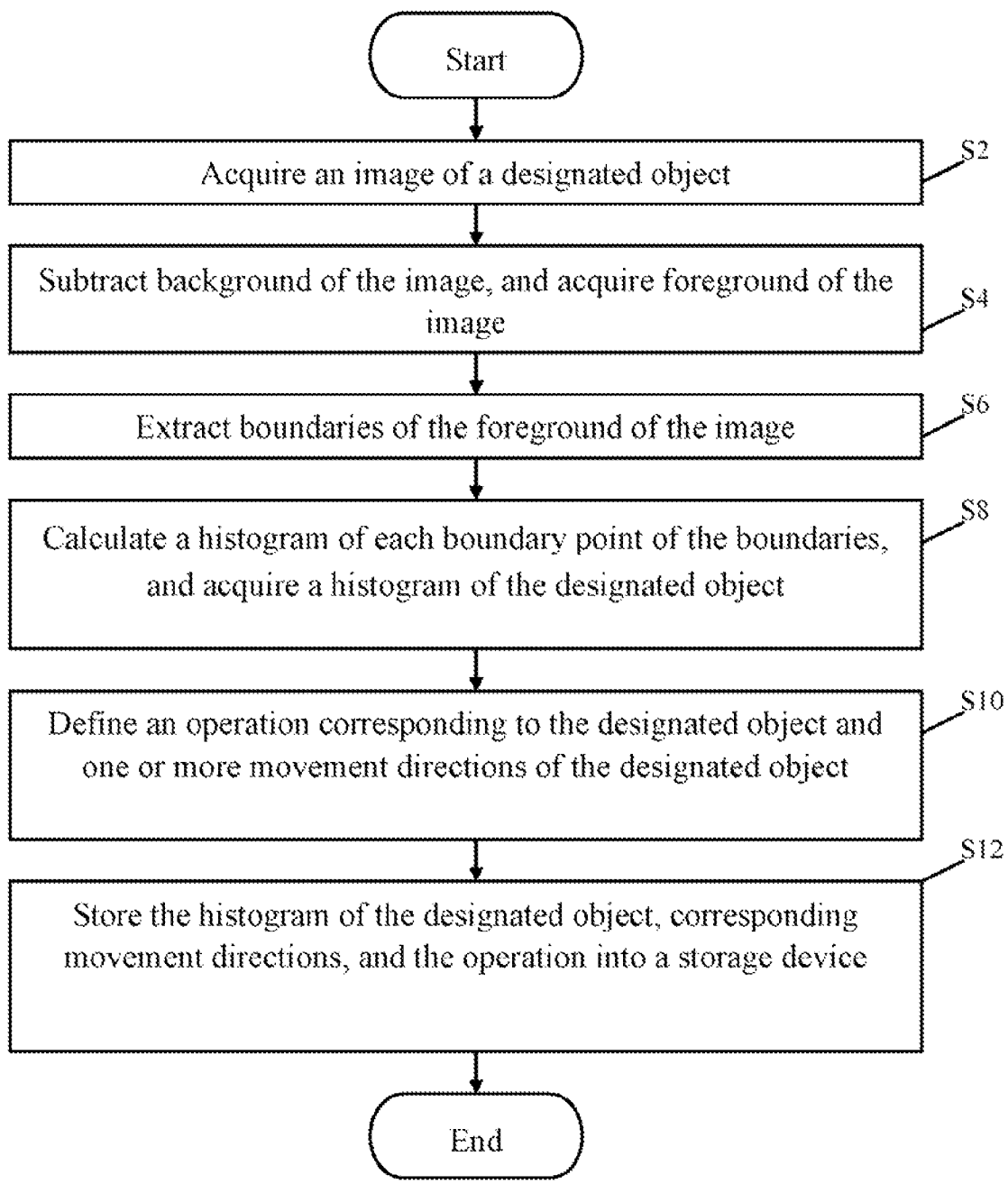
FIG. 4 is a flowchart of an embodiment of a method for defining data using the operation system of FIG. 2.

FIG. 4 is a flowchart of an embodiment of a method for defining data using the operation system 2 of FIG. 2. Depending on the embodiment, additional blocks may be added, others removed, and the ordering of the blocks may be replaced.

In block S2, the processing module 22 acquires an image of a designated object using the camera module 5.

In block S4, the processing module 22 subtracts background of the image to acquire foreground of the image using Gaussian mix model.

In block S6, the processing module 22 extracts boundaries of the foreground of the image.

In block S8, the processing module 22 calculates a histogram of each boundary point of the boundaries using log-polar coordinates, and acquires a histogram of the designated objects.

In block S10, the definition module 20 defines an operation corresponding to the designated object, or defines the operation corresponding to the designated objects and a movement direction of the designated objects.

In block S12, the definition module 20 stores the histogram of the plurality of designated objects, the movement directions, and corresponding operations into the database 120 of the storage device 12.

By repeating block S2 to S12, multiple operations may be defined to correspond to a plurality of designated objects and/or corresponding movement direction(s).

Figure 5:
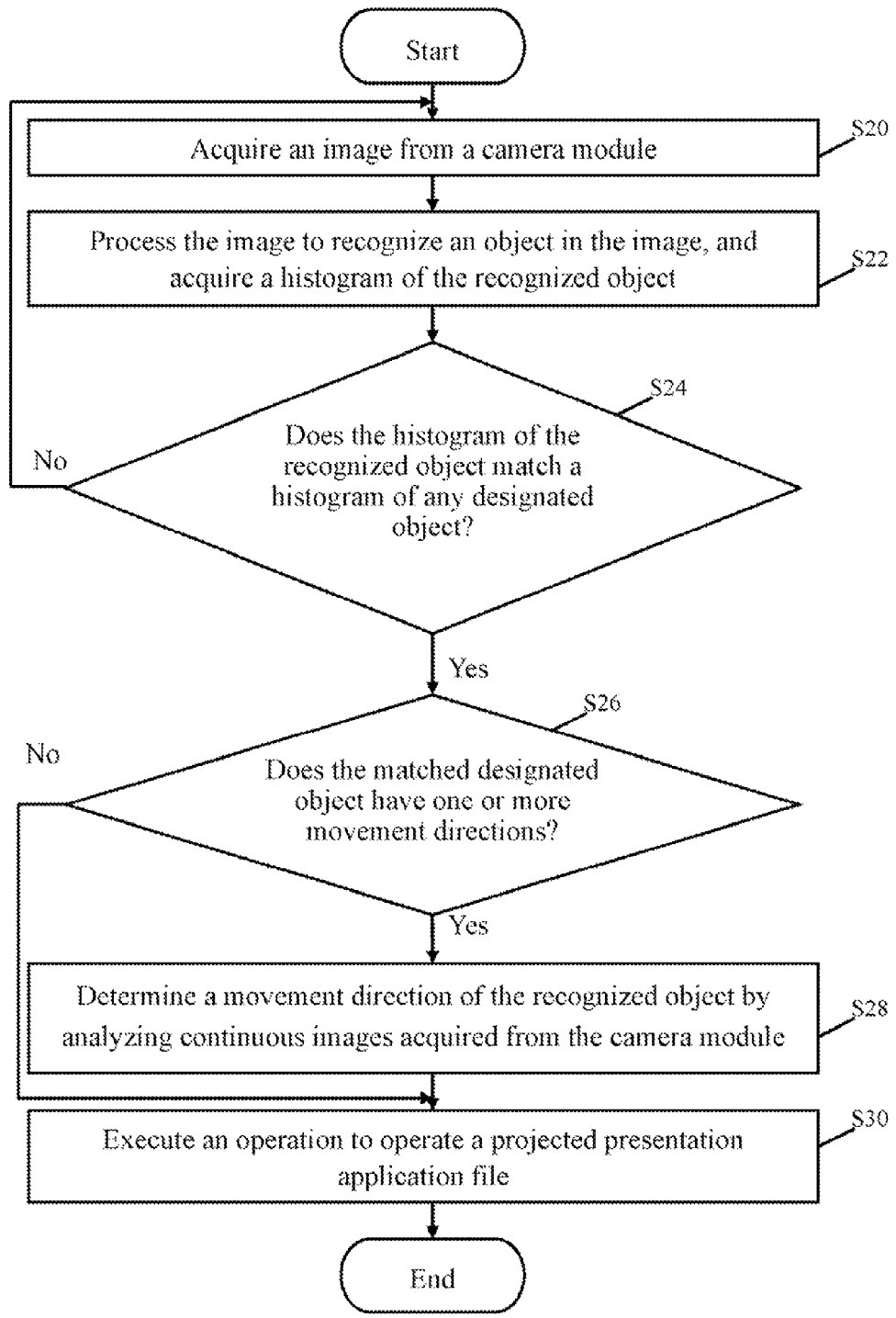
FIG. 5 is a flowchart of one embodiment of a method for operating presentation application files using the operation system of FIG. 2.

FIG. 5 is a flowchart of one embodiment of a method for operating presentation application files using the operation system 2 of FIG. 2. Depending on the embodiment, additional blocks may be added, others removed, and the ordering of the blocks may be replaced.

In block S20, the processing module 22 acquires an image from the camera module 5 when the operation system 2 is enabled.

In block S22, the processing module 22 processes the image to recognize an object in the image, and acquires a histogram of the recognized object using log-polar coordinates.

In block S24, the calculation module 24 compares the histogram of the recognized object with the histograms of the plurality of designated objects, and determines if the histogram of the recognized object matches a histogram of a designated object.

If the histogram of the recognized object matches a histogram of a designated object, in block S26, the calculation module 24 determines if the matched designated object has one or more corresponding movement directions. If the matched designated object has no corresponding movement directions, the procedure goes to block S30 directly.

If the matched designated object has one or more corresponding movement directions, in block S28, the processing module 22 acquires continuous images from the camera module 5, and the calculation module 24 determines a movement direction of the recognized object by analyzing the continuous images.

In block S30, the execution module 26 executes an operation corresponding to the designated object, or executes an operation corresponding to the designated object and the movement direction, so as to operate the projected presentation application file.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for operating a presentation application file using an electronic device, the electronic device in communication with a camera module and a projector, the method comprising:

acquiring a first image of each of a plurality of designated objects using the camera module;

processing the first image to acquire a histogram of each of the plurality of designated objects;

defining an operation corresponding to each of the plurality of designated objects;

acquiring a second image from the camera module, and processing the second image to recognize an object in the second image;

acquiring a histogram of the recognized object using log-polar coordinates;

determining a matched designated object by comparing the histogram of the recognized object with the histograms of the designated objects; and executing an operation corresponding to the matched designated object to operate a presentation application file projected by the projector.

2. The method according to claim 1, wherein the step of processing the first image to acquire a histogram of each of the plurality of designated objects comprises:

subtracting background of the first image, and acquiring foreground of the first image;

extracting boundaries of the foreground of the first image; and calculating a histogram of each boundary point of the boundaries using log-polar coordinates, and acquiring the histogram of each of the plurality of designated objects.

3. The method according to claim 1, wherein the step of acquiring a histogram of the recognized object using log-polar coordinates comprises:

subtracting background of the second image, and acquiring foreground of the second image;

extracting boundaries of the foreground of the second image; and calculating a histogram of each boundary point of the boundaries using log-polar coordinates, and acquiring the histogram of the recognized object.

4. The method according to claim 1, further comprising:

defining an operation corresponding to each of the plurality of designated objects and a movement direction of each of the plurality of designated objects.

5. The method according to claim 4, further comprising:

in response to determining the matched designated object, acquiring continuous images from the camera module;

determining a movement direction of the recognized object by analyzing the continuous images;

determining if the movement direction of the recognized object matches the movement direction of the matched designated object; and executing an operation to operate the projected presentation application file, the operation corresponding to the matched designated object and the movement direction, if the movement direction of the recognized object matches the movement direction of the matched designated object.

6. The method according to claim 1, further comprising:

in response to receiving modifications on the projected presentation application file by executing the operation, recognizing start coordinates and end coordinates of the modifications;

mapping the start coordinates and end coordinates of the modifications on the projected presentation application file to a presentation application file opened in the electronic device; and modifying the presentation application file opened in the electronic device according to the modifications on the projected presentation application file.

7. The method according to claim 1, wherein the operation comprises paging up, paging down, deleting contents, or using a pen to underline selected content.

8. An electronic device in communication with a camera module and a projector, the electronic device comprising:
a storage device;
at least one processor; and
one or more programs stored in the storage device and being executable by the at least one processor, the one or more programs comprising:
a processing module operable to acquire a first image of each of a plurality of designated objects using the camera module, and process the first image to acquire a histogram of each of the plurality of designated objects;
a definition module operable to define an operation corresponding to each of the plurality of designated objects;
the processing module further operable to acquire a second image from the camera module, process the second image to recognize an object in the second image, and acquire a histogram of the recognized object using log-polar coordinates;
a calculation module operable to determine a matched designated object by comparing the histogram of the recognized object with the histograms of the designated objects; and
an execution module operable to execute the operation corresponding to the matched designated object to operate a presentation application file projected by the projector, in response to determining that the histogram of the recognized object matches a histogram of a designated object.

9. The electronic device according to claim 8, wherein the processing module processes the first image to acquire a histogram of each of the plurality of designated objects by subtracting background of the first image, and acquiring foreground of the first image, extracting boundaries of the foreground of the first image, and calculating a histogram of each boundary point of the boundaries using log-polar coordinates, and acquiring the histogram of each of the plurality of designated objects.

10. The electronic device according to claim 8, wherein the processing module acquires a histogram of the recognized object using log-polar coordinates by subtracting background of the second image, and acquiring foreground of the second image, extracting boundaries of the foreground of the second image, and calculating a histogram of each boundary point of the boundaries using log-polar coordinates, and acquiring the histogram of the recognized object.

11. The electronic device according to claim 8, wherein the definition module is further operable to define an operation corresponding to each of the plurality of designated objects and a movement direction of each of the plurality of designated objects.

12. The electronic device according to claim 11, wherein:
the processing module is further operable to acquire continuous images from the camera module;
the calculation module is further operable to determine a movement direction of the recognized object by analyzing the continuous images; and
the execution module is further operable to execute an operation to operate the projected presentation application file, the operation corresponding to the matched designated object and the movement direction, if the movement direction of the recognized object matches the movement direction of the matched designated object.

13. The electronic device according to claim 8, wherein the one or more programs further comprise a sync module operable to recognize start coordinates and end coordinates of modifications in response to receiving the modifications on the projected presentation application file by executing the operation, map the start coordinates and end coordinates of the modifications on the projected presentation application file to a presentation application file opened in the electronic device, and modify the presentation application file opened in the electronic device according to the modifications on the projected presentation application file.

14. The electronic device according to claim 8, wherein the operation comprises paging up, paging down, deleting contents, or using a pen to underline selected content.

15. A storage medium storing a set of instructions, the set of instructions capable of being executed by a processor to perform a method for operating a presentation application file using an electronic device, the electronic device in communication with a camera module and a projector, the method comprising:
acquiring a first image of each of a plurality of designated objects using the camera module;
processing the first image to acquire a histogram of each of the plurality of designated objects;
defining an operation corresponding to each of the plurality of designated objects;
acquiring a second image from the camera module, and processing the second image to recognize an object in the second image;
acquiring a histogram of the recognized object using log-polar coordinates;
determining a matched designated object by comparing the histogram of the recognized object with the histograms of the designated objects; and
executing an operation corresponding to the matched designated object to operate a presentation application file projected by the projector.

16. The storage medium as claimed in claim 15, wherein the step of processing the first image to acquire a histogram of each of the plurality of designated objects comprises:
subtracting background of the first image, and acquiring foreground of the first image;
extracting boundaries of the foreground of the first image; and
calculating a histogram of each boundary point of the boundaries using log-polar coordinates, and acquiring the histogram of each of the plurality of designated objects.

17. The storage medium as claimed in claim 15, wherein the step of acquiring a histogram of the recognized object using log-polar coordinates comprises:
subtracting background of the second image, and acquiring foreground of the second image;
extracting boundaries of the foreground of the second image; and
calculating a histogram of each boundary point of the boundaries using log-polar coordinates, and acquiring the histogram of the recognized object.

18. The storage medium as claimed in claim 15, wherein the method further comprises:
defining an operation corresponding to each of the plurality of designated objects and a movement direction of each of the plurality of designated objects.

19. The storage medium as claimed in claim 18, wherein the method further comprises:
- in response to determining the matched designated object, acquiring continuous images from the camera module;
- determining a movement direction of the recognized object by analyzing the continuous images;
- determining if the movement direction of the recognized object matches the movement direction of the matched designated object; and
- executing an operation to operate the projected presentation application file, the operation corresponding to the matched designated object and the movement direction, if the movement direction of the recognized object matches the movement direction of the matched designated object.

20. The storage medium as claimed in claim 15, wherein the method further comprises:
- in response to receiving modifications on the projected presentation application file by executing the operation, recognizing start coordinates and end coordinates of the modifications;
- mapping the start coordinates and end coordinates of the modifications on the projected presentation application file to a presentation application file opened in the electronic device; and
- modifying the presentation application file opened in the electronic device according to the modifications on the projected presentation application file.

* * * * *